United States Patent Office 3,342,687
Patented Sept. 19, 1967

3,342,687
ORAL PREPARATION
David Huntington Gould, Leonia, N.J., assignor to Colgate-Palmolive Company, New York, N.Y., a corporation of Delaware
No Drawing. Filed June 25, 1964, Ser. No. 378,075
18 Claims. (Cl. 167—93)

This invention relates to oral preparations. More particularly, it relates to oral preparations containing an antimicrobial agent.

In accordance with the present invention, a composition for the care of the oral cavity comprises an oral preparation and an antimicrobial agent. The antimicrobial agent which is employed in the compositions of the present invention consists of a nitrogenous base and acid-addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E\,^{1\%}_{1\,cm.} = 280$$

at 279 millimicrons and a minimum of $$E\,^{1\%}_{1\,cm.} = 29$$

at 232 millimicrons; exhibiting strong absorption in the infrared of the spectrum when suspended in a 7% chloroform solution at the following frequencies expressed in reciprocal centimeters: 2933, 1727, 1597 and 1163; having an optical rotation $[\alpha]_D^{25} = -40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution. Examples of useful acid addition salts of the aforesaid base include the salts formed with salicylic, citric, tartaric, gluconic, benzoic, acetic, and sulfuric acids, and hydrogen chloride and hydrogen fluoride, i.e., the salicylate, citrate, tartarate, gluconate, benzoate, acetate, sulfate hydrochloride, and hydrofluoride salts. The tartrate salt is preferred for use in the instant compositions because of its non-toxic character. This antimicrobial agent and its salts are more particularly described, along with a method for the preparation thereof, in Canadian Patent No. 660,576 in which the isolation of this substance from *Streptomyces caelestis*, NRRL 2821, is described. A closely related agent, which may be identical thereto, appears also to be disclosed as "PA-108" in the publication by Murai et al. in "Antibiotics and Chemotherapy," vol. IX, No. 8, August 1959, pages 485–490.

On topical application to the oral cavity, the instant compositions exhibit highly desirable and effective activity on health and cleanliness in that specific area. Thus, daily introduction of the instant compositions into the oral cavity has been found to diminish mouth odor, to reduce the formation of plaque, and to decrease the formation of calculus and of caries. Nothwithstanding these prophylactic activities on diseases of the oral cavity, on complete ingestion of these compositions by test animals in amounts normally used, and even in amounts as high as 100 times those normally used, no evidence can be found of the presence of, or of any action of, the instant compositions in the bloodstream of such animals.

The instant compositions are highly beneficial and advantageous in meeting the stringent balance of requirements for effective treatment of said oral diseases in that they are stable, they provide for treatment of these diseases at the site thereof, and are safe to use by virtue of the lack of absorption of the said antimicrobial agent into the internal body system.

The antimicrobial agent of the present compositions may be used in any preparation for human use, as hereinafter described and claimed, designed for applications to and/or care of the oral cavity. Such preparations are referred to herein as oral preparations, and include suitable toothpastes and dental creams, toothpowders, lozenges, tablets, foods (especially those containing carbohydrates), candies, chewing gum, mouthwashes, and the like. These compositions characteristically may contain an organic surface-active agent and, preferably, a cosmetically acceptable flavor or flavoring agent, in addition to the instant antimicrobial agent. The stability of the instant compositions is excellent in that they retain useful activity for prolonged periods of time.

The instant compositions normally have a pH between about 5 and 9 and preferably on the order of about 6–7. Suitably a buffering system may be employed to assure maintenance of a pH within the aforesaid range of 5 to 9 in order to insure against a reduction in activity of the composition which occurs under more alkaline or acidic conditions. Solutions in water of acid salts may be employed, or of the free base in aqueous ethanol or other non-toxic solvents, e.g., diethylacetamide and dimethyl sulfoxide. Also, fine suspensions in water, 50% glycerine, aqueous sodium carboxymethyl cellulose, Irish moss or other suitable vehicles may be used.

Any suitable amount of the antimicrobial agent may be incorporated in the oral preparations of the present invention. The specific amount will vary, naturally, depending upon the specific type of preparation and the specific effects desired, but will generally be a minor amount of the composition, usually at least about 0.01% and up to about 25 percent by weight thereof. In the case of dentifrices such as dental creams, it is usual to use an amount on the order of about 0.01 to 0.5 percent and preferably about 0.02 to 0.3 percent by weight.

Any suitable substantially water-insoluble polishing agent may be employed in the preparation of dentifrice compositions, such as toothpastes, powders, creams and the like, in accordance with the present invention. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcium sulfate, bentonite, etc., including suitable mixtures thereof. It is preferred to use the water-insoluble phosphate salts as the polishing agents and, more particularly, insoluble sodium metaphosphate and/or a calcium phosphate, such as dicalcium phosphate dihydrate. In general, these polishing agents will comprise a major proportion by weight of the solid ingredients. The polishing agent content is variable, but will generally be up to about 95% by weight of the total composition. In the case of a dental cream, such polishing agents will generally be about 20–75% whereas in toothpowders and dental tablets, the polishing agents will usually be in greater proportion, such as about 70–95%.

In the preparation of toothpowders, it is usually sufficient to admix mechanically, e.g., by milling, the various solid ingredients, in appropriate quantities and particle sizes.

In dental cream formulations, the liquids and solids should necessarily be proportioned to form a creamy mass of desired consistency which is extrudable from an aerosol container or a collapsible, e.g., aluminum or lead, tube. In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like matreials, e.g., Irish moss, gum tragacanth, sodium carboxymethyl cellulose, polyvinylpyrrolidone, starch, and the like, usually in an amount up to about 10%, and preferably about 0.2–5% of the formulation.

In other compositions such as mouth rinses and the like, the aqueous vehicle may comprise from about 20 to as much as 99% of the formulation. Organic surface-active agents used in the compositions of the present invention may co-act with the antimicrobial agent to achieve increased prophylactic action, assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface active materials include nonionic agents such as condensates of sorbitan monostearate with approximately 60 moles of ethylene oxide, condensates of ethylene oxide with propylene oxide condensates of propylene glycol ("Pluronics") and cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12 to 18 carbon atoms) and two (poly)oxyethylene groups attached to the nrtiogen (typically containing a total of from about 2 to 50 ethenoxy groups per molecule) and salts thereof with acids, and compounds of the structure

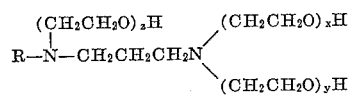

where R is a fatty alkyl group containing from about 12 to 18 carbon atoms, and $x$, $y$ and $z$ total 3 or higher, as well as salts thereof with mineral or organic acids.

It is preferred to use from about 0.05 to 5% by weight of the foregoing surface-active materials in the instant oral preparations.

Various other materials may be incorporated in the oral preparations of this invention. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely affect the properties and characteristics suitably selected and used in proper amount depending upon the particular type of preparation involved.

For some purposes of oral health it may be desirable to include further antibacterial agents in the compositions of the present invention. For example, in combating acid production in the oral cavity it has been found that the inclusion of twenty parts of $N^1$-(4-chlorobenzyl)-$N^5$-(2,4-dichlorobenzyl) biguanide for each part of the instant bacterial agent achieves an effect substantially greater than may be anticipated on the basis of the action of either agent per se. The same combination also exhibits increased anti-odor action as compared to comparable compositions containing only the instant anti-microbial agent. Additional antibacterial agents which may be used in the instant formulations, in amounts ranging from 0.01% to 5% (and preferably about 0.05% to 1.0%) are, for example germicidal agents of the guanidine, biguanide, and amine types such as the following:

p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorphenyl-$N^5$-laurylbiguanide;
5-amino-1,3-bis(2-ethylhexyl)-5-methylhexahydropyrimidine;

and their non-toxic acid addition salts.

Any suitable flavoring or sweetening materials may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate and saccharine. Suitably, flavor and sweetening agent may together comprise from about 0.01 to 5% or more of the compositions of the instant invention.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2 \cdot KF$), sodium hexafluorostannate, stannous chlorofluoride, and sodium monofluorophosphate. These materials, which dissociate or release fluorine-containing ions in water, suitably may be present in an effective but non-toxic amount, usually within the range of about 0.01 to 1% by weight of the water soluble fluorine content thereof.

The following specific examples are further illustrative of the nature of the present invention but it is to be understood that the invention is not limited thereto. The compositions of these examples are prepared in the usual manner using the free base of the antimicrobial agent and all amounts and proportions, in these examples as well as elsewhere throughout the instant specification and claims, are by weight unless otherwise specified.

EXAMPLE I.—DENTAL CREAM

| | Parts |
|---|---|
| Antimicrobial agent[1] | 0.1 |
| Sodium benzoate | 0.15 |
| Saccharine | 0.20 |
| Sodium lauryl sulfate | 1.5 |
| Insoluble sodium metaphosphate | 40.6 |
| Dicalcium phosphate dihydrate | 5.0 |
| Titanium dioxide | 0.4 |
| Stannous fluoride | 0.4 |
| Gum tragacanth | 1.4 |
| Oil of wintergreen | 1.0 |
| Color | 0.03 |
| Water | 22.12 |
| Glycerine (99.3%) | 27.10 |

[1] As hereinbefore defined in the form of the free base.

This composition is used by brushing the teeth therewith at least once daily.

In the above dental cream, the sodium lauryl sulfate may be replaced by sodium-N-lauroylsarcosinate, and the free base of the antimicrobial agent may be replaced by the hydrochloride salt thereof.

EXAMPLE II.—MOUTH RINSE

| | Parts |
|---|---|
| Antimicrobial agent of Example I | 0.1 |
| Diisobutyl phenoxy ethoxy ethyl dimethyl benzyl ammonium chloride | 0.075 |
| Sorbitan monostearate polyoxyethylene condensate containing about 60 moles of ethylene oxide | 0.6 |
| Saccharine | 0.035 |
| Alcohol | 14.78 |
| Water | 83.87 |
| Color | 0.04 |
| Oil of lemon | 0.50 |

This composition is used by rinsing of the oral cavity with about 10 cc. thereof once or more often daily.

In this mouth rinse, the free base of the antimicrobial agent maybe replaced by the tartrate salt thereof.

EXAMPLE III.—CHEWABLE TABLET FOR BRUSHING

| | Parts |
|---|---|
| Insoluble sodium metaphosphate | 32.59 |
| Dicalcium phosphate dihydrate | 4.03 |
| Poly(ethylene glycol) having a molecular weight of about 6000 | 5.00 |
| Saccharine | 0.25 |
| Sodium carboxymethylcellulose | 1.25 |
| Sodium lauryl sulfate | 2.25 |
| Starch | 3.0 |
| Mannitol | 47.3 |
| Talc | 0.5 |
| Magnesium stearate | 1.25 |
| Flavor, color, etc. | 2.48 |
| Antimicrobial agent of Example I | 0.1 |

The tablet is employed as a dentifrice by introducing into the mouth a tablet thereof having a weight of about 0.5 grams, crushing it between the teeth, and then brushing the teeth in the usual fashion with saliva acting as a fluid vehicle for the crushed tablet particles.

EXAMPLE IV.—DENTAL CREAM

| | Parts |
|---|---|
| Antimicrobial agent of Example I | 0.1 |
| Sodium saccharinate | 0.2 |
| Sodium benzoate | 0.5 |
| Tetrasodium pyrophosphate | 0.25 |
| Dicalcium phosphate dihydrate | 36.75 |
| Calcium carbonate | 5.0 |
| Sodium carboxymethylcellulose | 0.75 |
| Sodium N-lauroylsarcosinate | 2.0 |
| Glycerine (99.3%) | 23.95 |
| Oils of peppermint and spearmint, 1:1 | 0.8 |
| Water | 19.7 |

EXAMPLES V AND VI.—DENTIFRICES

| | Example V | Example VI |
|---|---|---|
| | Parts | Parts |
| Glycerine | 27.1 | 25.286 |
| Irish moss | 1.3 | |
| Saccharin | 0.2 | 0.200 |
| Sodium benzoate | 0.15 | 0.500 |
| Water (deionized) | 22.550 | 14.220 |
| Alumina | | 52.280 |
| Sodium N-lauroyl sarcosinate (35% soln.) | | 5.714 |
| Flavor | 1.0 | 0.800 |
| Antimicrobial agent of Example I | 0.20 | 0.100 |
| Sodium carboxymethylcellulose | | 0.900 |
| Sodium lauryl sulfate | 1.50 | |
| Insoluble sodium metaphosphate | 45.60 | |
| Titanium dioxide | 0.4 | |

These dentifrice compositions are formulated to be free of calcium-containing materials which confers upon them improved ability to diminish calculus formation when used for normal brushing of the teeth in a substantially daily regimen.

EXAMPLES VII AND VIII.—DENTIFRICES

| | Example VII | Example VIII |
|---|---|---|
| | Parts | Parts |
| Glycerine | 27.1 | 27.1 |
| Irish moss | 1.3 | 1.3 |
| Saccharin | 0.2 | 0.2 |
| Sodium benzoate | 0.15 | 0.15 |
| Sodium lauryl sulfate | 1.50 | 1.50 |
| Antimicrobial agent of Example I | 0.075 | 0.50 |
| Insoluble sodium metaphosphate | 40.6 | 40.6 |
| Anhydrous dicalcium phosphate | 5.0 | 5.0 |
| Titanium dioxide | 0.4 | 0.4 |
| Flavor | 1.0 | 1.0 |
| Water | 22.675 | 22.25 |

EXAMPLES IX AND X.—MOUTH RINSES

| | Example IX | Example X |
|---|---|---|
| | Parts | Parts |
| Ethyl alcohol 95% | 14.782 | 14.782 |
| Flavor | 0.218 | 0.318 |
| Sorbitan monostearate polyoxyethylene condensate containing about 80 moles of ethylene oxide | 2.500 | 0.800 |
| Antimicrobial agent of Example I | 0.300 | 0.020 |
| Glycerine | 10.000 | 10.000 |
| Deionized water | 71.580 | 73.528 |
| Saccharin | 0.040 | |
| Color (1% soln.) | 0.550 | 0.550 |
| Citric acid monohydrate | 0.030 | |

EXAMPLE XI.—DENTAL CREAM

| | Parts |
|---|---|
| Glycerine | 12.88 |
| Water | 13.23 |
| Sodium N-lauroyl sarcosinate | 2.0 |
| Antimicrobial agent of Example I | 0.1 |
| 1,6-di-p-chlorophenylbiguanidohexane diacetate | 0.25 |
| Irish moss | 1.00 |
| Saccharin | 0.2 |
| Sodium metaphosphate-insoluble | 41.85 |
| Dicalcium phosphate dihydrate | 5.0 |
| Titanium dioxide | 0.4 |
| Sodium benzoate | 0.5 |
| Flavor | 0.8 |
| Color | 0.04 |
| Sorbitol (70% in aqueous solution) | 20.0 |
| Hydrated alumina | 1.0 |
| Sodium monofluorophosphate | 0.75 |

EXAMPLES XII AND XIII.—DENTIFRICE COMPOSITIONS

|  | Example XII | Example XIII |
| --- | --- | --- |
|  | Parts | Parts |
| Glycerine | 25.39 | 12.88 |
| Water | 20.0 | 13.38 |
| Sodium lauroyl sarcosinate |  | 2.00 |
| Sodium lauroyl sarcosinate (35% soln.) | 5.71 |  |
| Antimicrobial agent of Example I | 0.25 | 0.20 |
| Irish moss | 1.30 | 1.00 |
| Saccharine | 0.2 | 0.2 |
| Sodium metaphosphate-insoluble | 40.6 | 41.85 |
| Dicalcium phosphate-anhydrous | 5.0 | 5.0 |
| Titanium dioxide | 0.4 | 0.4 |
| Benzoic acid | 0.25 |  |
| Sodium benzoate | 0.1 | 0.5 |
| Flavor | 0.8 | 0.8 |
| Color |  | 0.04 |
| Sorbitol (70% solution) |  | 20.00 |
| Hydrated alumina |  | 1.0 |
| Sodium monofluorophosphate |  | 0.75 |

EXAMPLES XIV–XVI.—CHEWABLE DENTIFRICE TABLETS

EXAMPLE XIV

| | Parts |
| --- | --- |
| Dicalcium phosphate dihydrate | 76.13 |
| Sodium lauryl sulfate | 0.50 |
| Hyrodgenated coconut oil monoglyceride sulfate sodium salt | 1.20 |
| Di - isobutyl phenoxyethoxyethyl dimethylbenzyl ammonium chloride | 0.10 |
| Polyethylene glycol 6000 | 10.00 |
| Arrowroot starch | 2.50 |
| Carboxymethylcellulose 7 MP | 1.25 |
| Cab-O-Sil (submicroscopic SiO$_2$) | 1.25 |
| Flavor | 1.75 |
| Saccharin | 0.30 |
| Polyvinyl alcohol (Plasdone) | 2.92 |
| Talc | 2.00 |
| Antimicrobial agent of Example I | 0.10 |

EXAMPLE XV

| | |
| --- | --- |
| Magnesium silicate | 7.000 |
| Diammonium phosphate | 5.000 |
| Monoammonium phosphate | 0.500 |
| Urea | 3.000 |
| Saccharin, sodium | 0.300 |
| Flavor | 2.500 |
| Tricalcium phosphate | 19.100 |
| Calcium carbonate | 58.000 |
| Hydrogenated coconut acid monoglyceride sulfate sodium salt | 4.500 |
| Antimicrobial agent of Example I | 0.100 |

EXAMPLE XVI

| | |
| --- | --- |
| Magnesium silicate | 7.000 |
| Saccharin, sodium | 0.150 |
| Flavor | 2.500 |
| Dicalcium phosphate | 85.800 |
| Hydrogenated coconut acid monoglyceride sulfate sodium salt | 4.500 |
| Antimicrobial agent of Example I | 0.050 |

These compositions are employed as dentifrices by introducing into the mouth a tablet thereof having a weight of about 0.5 to 1.0 grams, crushing it between the teeth, and then brushing the teeth in the usual manner. The dentifrice particles will tend to be captured by the food-trapping pits, fissures and interproximal which are most occlusive of food thereby collecting in such areas of greatest need.

Although the present invention has been described with reference to particular embodiments and examples, it will be apparent to those skilled in the art that variations and modifications of this invention can be made and that equivalence can be substituted therefore without departing from the principles and true spirit of the invention.

What is claimed is:

1. A composition comprising a topical oral preparation containing a polishing agent and an effective amount up to about 25% by weight of said topical oral preparation of an antimicrobial substance selected from the group consisting of a nitrogenous base and acid-addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.} = 280$$

at 279 millimicrons and a minimum of $$E^{1\%}_{1\,cm.} = 29$$

at 232 millimicrons; exhibiting strong absorption in the infrared of the spectrum when suspended in a 7% chloroform solution at the following frequencies expressed in reciprocal centimeters: 2933, 1727, 1597, and 1163; having an optical rotation $[\alpha]_D^{25} = -40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution.

2. A composition as set forth in claim 1 having a pH of between about 5 and about 9.

3. A composition as set forth in claim 1 which includes a surface-active agent.

4. A composition as set forth in claim 1 which contains a cosmetically acceptable flavor.

5. A composition as set forth in claim 1 which contains the tartrate salt of said antimicrobial substance.

6. A composition as set forth in claim 1 which contains an antibacterial agent selected from the group consisting of quarternary ammonium, biguanide, guanidine, and amine germicides.

7. A topical oral preparation which comprises about 20 to about 99% by weight of said topical oral preparation of an aqueous-ethanol vehicle and an effective amount up to about 25% by weight of said topical oral preparation of an antimicrobial substance selected from the group consisting of a nitrogeneous base and acid addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.} = 280$$

at 279 millimicrons and a minimum of $$E^{1\%}_{1\,cm.} = 29$$

at 232 millimicrons; exhibiting a strong absorption in the infrared of the spectrum when suspended in a 7% chloroform solution at the following frequencies expressed in reciprocal centimeters; 2933, 1727, 1997, and 1163; having an optical rotation $[\alpha]_D^{25} = -40°$ (1% in chloroform); an empirical formula of $$C_{38}H_{61}NO_{14}$$

an elemental analysis of 60.37% carbon, 8.31% hydrogen, 1.91% nitrogen and 29.51% oxygen by difference; a calculated molecular weight of 756 and a pKa of 6.7 when titrated in 50% aqueous-ethanol solution.

8. A process for the reduction of plaque formation on teeth which comprises the daily introduction into the oral cavity of a human in contact with the teeth of a composition comprising an oral preparation and a topical antimicrobial substance selected from the group consisting of a nitrogenous base and acid-addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.}=280$$

at 279 millimicrons and a minimum of $$E^{1\%}_{1\,cm.}=29$$

at 232 millimicrons; exhibiting strong absorption in the infrared of the spectrum when suspended in a 7% chloroform solution at the following frequencies expressed in reciprocal centimeters: 2933, 1727, 1597, and 1163; having an optical rotation $[\alpha]_D^{25}=-40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution.

9. A dental cream comprising a liquid vehicle, at least about 20% by weight of a polishing material suspended therein, and about 0.01 to about 0.5% by weight of an antimicrobial substance selected from the group consisting of a nitrogenous base and acid-addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.}=280$$

at 279 millimicrons and a minimum of $$E^{1\%}_{1\,cm.}=20$$

at 232 millimicrons; exhibiting strong absorption in the infrared of the spectrum when suspended in a 7% chloroform solution at the following frequencies expressed in reciprocal centimeters: 2933, 1727, 1597, and 1163; having an optical rotation $[\alpha]_D^{25}=-40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution.

10. A process for improving oral health and cleanliness, which comprises applying to the oral cavity of a human a topical oral preparation containing as the prophylactic agent an antimicrobial substance selected from the group consisting of a nitrogenous base and acid-addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.}=280$$

at 279 millimicrons and a minimum of $$E^{1\%}_{1\,cm.}=29$$

at 232 millimicrons; exhibiting strong absorption in the infrared of the spectrum when suspended in a 7% chloroform solution at the following frequencies expressed in reciprocal centimeters: 2933, 1727, 1597, and 1163; having an optical rotation $[\alpha]_D^{25}=-40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution.

11. A process for diminishing mouth odor and the formation of plaque, which comprises the approximately daily application to the oral cavity of a human in contact with the teeth of a topical oral preparation containing as the active treating agent an antimicrobial substance selected from the group consisting of a nitrogenous base and acid-addition salts thereof, said base having the following properties; soluble in methanol, ethanol, chloroform, ethyl acetate, and benzene but insoluble in saturated hydrocarbons; an ultraviolet absorption spectrum in chloroform exhibting a maximum of $$E^{1\%}_{1\,cm.}=280$$

at 279 millimicrons and a minimum of $$E^{1\%}_{1\,cm.}=29$$

at 232 millimicrons; exhibiting strong absorption in the infrared of the spectrum when suspended in a 7% chloroform solution at the following frequencies expressed in reciprocal centimeters: 2933, 1727, 1597 and 1163; having an optical rotation $[\alpha]_D^{25}=-40°$ (1% in chloroform); an empirical formula of $C_{38}H_{61}NO_{14}$; an elemental analysis of 60.37% carbon, 8.31% hydrogen, 1.91% nitrogen and 29.51% oxygen by difference; a calculated molecular weight of 756 and a pKa of 6.7 when titrated in 50% aqueous ethanol solution.

12. A dental cream comprising about 20 to 75% by weight of a liquid vehicle, about 20 to 75% by weight of a polishing material suspended therein, about 0.2 to 10% of a gelling agent, about 0.05 to about 5% of a water-soluble organic foaming detergent, about 0.01 to 5% by weight of a cosmetically acceptable flavor, and about 0.01 to about 0.5% by weight of an antimicrobial substance selected from the group consisting of a nitrogeneous base and acid addition salts thereof, said base having the following properties: soluble in methanol, ethanol, chloroform, ethyl acetate, and benzene but insoluble in saturated hydrocarbons; an ultraviolet absorption spectrum in chloroform exhibiting a maximum of $$E^{1\%}_{1\,cm.}=280$$

at 279 millimicrons and a minimum of $$E^{1\%}_{1\,cm.}=20$$

at 232 millimicrons; exhibiting strong absorption in the infrared of the spectrum when suspended in a 5% chloroform solution at the following frequencies expressed in reciprocal centimeters: 2933, 1727, 1597 and 1163; having an optical rotation $[\alpha]_D^{25}=-40°$ (1% in chloroform); an empirical formula of $C_{38}H_{61}NO_{14}$; an elemental analysis of 60.37% carbon, 8.21% hydrogen, 1.91% nitrogen and 29.51% oxygen by difference; a calculated molecular weight of 756 and a pKa of 6.7 when titrated in 50% aqueous ethanol solution.

13. A dental cream as set forth in claim 12 in which said water-soluble organic foaming detergent is selected from the group consisting of sodium N-lauroyl sarcosinate and sodium lauryl sulfate.

14. A dental cream as set forth in claim 12 in which said polishing material is selected from the group consisting of dicalcium phosphate, insoluble sodium metaphosphate, alumina and calcium carbonate.

15. A dental cream as set forth in claim 12 which contains about 0.01 to 5% by weight of an additional antibacterial agent.

16. A dental cream as set forth in claim 15 in which said antibacterial agent is 1,6-di-p-chlorophenyl-biguanidohexane diacetate.

17. A dental cream as set forth in claim 12 which contains a fluorine-containing compound having a beneficial effect on the care and hygiene of the oral cavity in an effective but non-toxic amount.

18. A dental cream as set forth in claim 17 in which said compound is selected from the group consisting of stannous fluoride, sodium fluoride, and sodium monofluorophosphate.

References Cited

UNITED STATES PATENTS

| | | | |
|---|---|---|---|
| 3,001,911 | 9/1961 | Shell | 167—65 |
| 3,087,858 | 4/1963 | Buckwalter et al. | 167—65 |

FOREIGN PATENTS

| | | |
|---|---|---|
| 660,576 | 4/1963 | Canada. |
| 706,520 | 3/1954 | Great Britain. |

OTHER REFERENCES

Science News Letter, March 4, 1945, p. 180, 167–65 AB Dental.

LEWIS GOTTS, *Primary Examiner.*

R. L. HUFF, *Assistant Examiner.*

UNITED STATES PATENT OFFICE

CERTIFICATE OF CORRECTION

Patent No. 3,342,687                        September 19, 1967

David Huntington Gould

It is certified that error appears in the above identified patent and that said Letters Patent are hereby corrected as shown below:

Column 9, line 40 and column 10, line 47, for "20", each occurrence, read -- 29 --.

Signed and sealed this 1st day of July 1969.

(SEAL)
Attest:

Edward M. Fletcher, Jr.                WILLIAM E. SCHUYLER, JR.
Attesting Officer                          Commissioner of Patents